United States Patent
Waite

(10) Patent No.: US 7,113,124 B2
(45) Date of Patent: Sep. 26, 2006

(54) CENTERLINE AND DEPTH LOCATING METHOD FOR NON-METALLIC BURIED UTILITY LINES

(75) Inventor: James W. Waite, Los Gatos, CA (US)

(73) Assignee: Metrotech Corporation, Inc., Santa Clara, CA (US)

(*) Notice: Subject to any disclaimer, the term of this patent is extended or adjusted under 35 U.S.C. 154(b) by 0 days.

(21) Appl. No.: 10/997,729

(22) Filed: Nov. 23, 2004

(65) Prior Publication Data

US 2005/0156776 A1 Jul. 21, 2005

Related U.S. Application Data

(60) Provisional application No. 60/525,291, filed on Nov. 25, 2003.

(51) Int. Cl.
*G01S 13/66* (2006.01)
*G01V 3/12* (2006.01)

(52) U.S. Cl. .................. 342/22; 324/326; 324/329
(58) Field of Classification Search .............. 342/22, 342/52; 324/326, 329
See application file for complete search history.

(56) References Cited

U.S. PATENT DOCUMENTS

| | | |
|---|---|---|
| 4,723,216 A | 2/1988 | Premerlani |
| 4,802,009 A | 1/1989 | Hartmeier |
| 4,942,360 A | 7/1990 | Candy |
| 5,025,227 A | 6/1991 | Walton |
| 5,231,355 A | 7/1993 | Rider et al. |
| 5,260,659 A | 11/1993 | Flowerdew et al. |
| 5,321,613 A | 6/1994 | Porter et al. |
| 5,541,516 A | 7/1996 | Rider et al. |
| 5,642,050 A | 6/1997 | Shoemaker |
| 6,023,986 A | 2/2000 | Smith et al. |
| 6,140,819 A | 10/2000 | Peterman |
| 6,240,367 B1 | 5/2001 | Lin |
| 6,310,579 B1 | 10/2001 | Meredith |
| 6,396,433 B1 * | 5/2002 | Clodfelter .................. 342/22 |
| 6,424,820 B1 | 7/2002 | Burdick et al. |
| 6,529,006 B1 * | 3/2003 | Hayes .................. 324/326 |
| 6,735,263 B1 | 5/2004 | Moriya et al. |
| 6,751,553 B1 * | 6/2004 | Young et al. ............. 342/22 |

(Continued)

FOREIGN PATENT DOCUMENTS

EP 299724 A2 1/1989

(Continued)

OTHER PUBLICATIONS

Doolittle et al., "A comparison of EM induction and GPR methods in areas of karst," Geoderma, vol. 85, No. 1, Jul. 1998, pp. 83-102.*

(Continued)

*Primary Examiner*—Ian J. Lobo
(74) *Attorney, Agent, or Firm*—Finnegan, Henderson, Farabow, Garrett & Dunner, L.L.P.

(57) ABSTRACT

A locator capable of tracking buried, non-metallic utility lines (fiber optic, gas, water, waste, conduits) using ground penetrating radar (GPR) and an inertial position sensor is described. In some embodiments, a tracking filter is applied to a hyperbolic trajectory model based on the radar range data to determine a predicted track of the target utility line. After comparison of the predicted track to the measured inertial position, the centerline variance of the tracked line can be deduced. In some embodiments, an electromagnetic pipe and cable locator may also be included. Some embodiments of the invention can include accurate depth calibration and line depth tracking. Further, a display may provide results to a user in a simplified fashion.

2 Claims, 6 Drawing Sheets

U.S. PATENT DOCUMENTS

2002/0196177 A1* 12/2002 Johansson et al. ............ 342/22
2003/0046003 A1 3/2003 Smith et al.
2004/0070399 A1 4/2004 Olsson et al.
2005/0088301 A1 4/2005 Abbruscato

FOREIGN PATENT DOCUMENTS

EP 0 780 704 B 6/2001
RU 2 152 059 C1 6/2000

OTHER PUBLICATIONS

International Search Report and Written Opinion from Application No. PCT/US2004/018935 filed Jul. 15, 2004 (Our Reference No. 9131.0018-00).

U.S. Appl. No. 11/193,100, filed Jul. 29, 2005.

Copy of International Search Report and Written Opinion from PCT Application No. PCT/US05/27240 filed Jul. 29, 2005.

* cited by examiner

State Vector: $x, y, z, x_{line}, y_{line}, z_{line}, \dot{z}_{line}, u, v, \theta, \dot{\theta}, \varphi, \dot{\varphi}, \psi$ Measure: $\ddot{x}, \ddot{y}, t, \psi$ Calibrate, then assume constant: $v$ (variations are included in noise model)

Track: $x_{line}, y_{line}, z_{line}, \dot{\theta}$ (at centerline)

CENTERLINE AND DEPTH LOCATING METHOD FOR NON-METALLIC BURIED UTILITY LINES

RELATED APPLICATIONS

The present application claims priority to U.S. Provisional Application 60/525,291, "Centerline and Depth Locating Method for Non-Metallic Buried Utility Lines," filed on Nov. 25, 2003, by James W. Waite, herein incorporated by reference in its entirety

BACKGROUND

1. Field of the Invention

Embodiments of the present invention relate to tracking of concealed non-metallic underground utilities using a pipe and cable locator outfitted with ground penetrating radar and an inertial navigation device.

2. Discussion of Related Art

Utility conduits are often buried underground and not readily accessible. It is often necessary to locate these concealed utility conduits in order to repair and replace them. It is also important to know the location of utility conduits in order to avoid them while excavating an area. Examples of hidden utility conduits include pipelines for gas, sewage, or water and cables for telephone, television or power.

There are various ways to locate concealed objects, for example, using pipe and cable locators, also known as line locators. Conventional line locators are appropriate when seeking electrically conductive objects, such as metallic pipelines and cables. Line locators may also be used for finding non-electrically conducting conduits when the conduit is marked with a conducting trace wire or trace tape buried along the conduit. The process of applying an AC signal to the conductor at an accessible point and detecting the resulting electromagnetic radiation is well known in the art. When an AC signal is applied, the conductor acts as an antenna radiating an electromagnetic field along its entire length. A fully digital implementation of an electromagnetic line locator is disclosed in U.S. patent application Ser. No. 10/622,376, "Method and Apparatus for Digital Detection of Electromagnetic Signal Strength and Signal Direction in Metallic Pipes and Cables", by James W. Waite and Johan D. Överby.

A line locator used above ground detects electromagnetic emissions from conductors underground. A disadvantage with relying solely on the line locator device is that it may fail to identify and distinguish among various utility conduits and conductors, especially non-conductive lines, such as, for example, gas lines, fiber optic lines and plastic water lines when not marked with trace wires.

For some time, ground penetrating radar (GPR) systems have been used for utility locating applications. Several commercial systems exist, an example of which is shown in FIG. 1. All such systems present to the user a fairly complex grey-scale or color image of the radar pulse echo amplitude in a 2-D map of depth vs. horizontal ground position. This type of display, an example of which is shown in FIG. 2, is useful in survey and mapping applications, but provides far too much information for the ordinary user trained in line location techniques. In such existing systems, the results that signify the presence of underground utility lines are often not available until after post processing the image on a computer.

To accomplish an underground survey, the recommended mode of operation of such prior art GPR systems is depicted in FIG. 3. Dipole antenna assembly 301 is moved across the ground in the direction of path 304. Transmit "bowtie" antenna 302 couples a radar pulse 307 into the ground and receive bowtie antenna 303 receives a reflected signal 308. Utility lines 309 and 310 represent discontinuities in the dielectric constant of the soil medium, thus reflections occur and the lines can be discriminated from the background. Sequence of traces 311 represent an example of the radar return from lines 309, 310, and by viewing the entire sequence one can deduce the presence of an underground object. The aggregate image often takes the form of the series of overlapping hyperbolas seen in FIG. 2. Subsequent path directions 305, 306 are surveyed to fill in a large matrix of radar echo data. For test fields where there is no a priori knowledge of the direction of the utility lines 309, 310, a second set of paths are mapped which are orthogonal to paths 304, 305, 306, resulting in a 2-D grid of path directions.

From this collected data a post-processing operation can take place that determines the position of the underground utilities. The result of this operation is shown in FIG. 4. Though this particular pattern of utility lines is very complex, they are all denoted as having the same diameter, since for GPR systems, the object size (pipe or cable diameter) cannot normally be deduced. An exception to this rule is when the object size is greater than ¼ wavelength of the radar frequency. For common 500 Mhz GPR systems, lines less than six inches in diameter have a similar signal return and thus the size cannot be discriminated. At 200 MHz (which allows a deeper penetration of the radar signal, facilitating deeper detection of utility lines), the limit for object size detection is 15 inches.

The lack of a utility line diameter estimate is not a critical problem for the locate technician, since this feature is not available even when the line is metallic. A far larger problem is that existing GPR systems focus on collection of data, with subsequent post-processing, and not the detection and tracking in real-time of an individual utility line. Electromagnetic (EM) line locator user interfaces are designed for infrequent use. The locate technician must be able to pick up the instrument after sporadic use and be able to track a specific line though an unfamiliar area. The line location is often marked with paint and must have accuracy within accepted (and sometimes legal) guidelines. The images of the reflected GPR signals shown in FIG. 2, though appearing static in the figure, constantly change when the user is walking the locator down the line. Features are often inconsistent and unrecognizable when these maps are presented in real-time. Using conventional methods without off-line image processing, centerline errors that are only a few centimeters for electromagnetically traced lines would not be achievable for a GPR tracked line.

Depth of the target utility line is an important parameter in any locating task. This is because the locate operation often precedes a digging operation, and the result of the locate determines how deep a backhoe operator can dig without impacting the utility line. To achieve acceptable depth accuracy, prior art GPR systems must be calibrated by locating a known underground object on the same test site (since soil conditions must be identical between the calibration and the locate), and then digging down to the object to determine the exact depth. Without this absolute depth confirmation, GPR systems rely on a user-specified choice of the dielectric constant of the soil at the test site. This is often difficult at best, and depth determinations are subject to 20% tolerances in this scenario.

In light of the foregoing description, it would be desirable to develop a dual-mode line locator that simultaneously offers both metallic (electromagnetic) and non-metallic location methods, particularly for the real-time location of the line's centerline and depth. Since ground penetrating radar (GPR) is an accepted tool for the survey of underground buried objects, it would be of great advantage to algorithmically process radar range data obtained from such a GPR front-end and present a simple user interface display, enabling an operator familiar with conventional electromagnetic line tracing methods to trace non-conductive lines. It would be of further advantage if the dual mode locator achieved equivalent centerline and depth accuracies for both metallic and non-metallic utility lines, in real-time as a locate technician is walking the line and marking it with paint.

SUMMARY OF THE INVENTION

A dual mode line locator is described that combines conventional electromagnetic line locator techniques with ground penetrating radar (GPR), allowing accurate real-time tracking of position and depth for both metallic and non-metallic lines. More specifically a signal processing method is described to allow real-time line tracking in the GPR mode, which relies on range data (echo signals) from the radar system as well as dual-axis accelerometers for inertial tracking purposes. In particular, the preferred embodiment combines the GPR sensor inputs with a signal processing system and display device that emulates the user interface and tracking capabilities of traditional metallic pipe and cable locators. The preferred embodiment allows the visual presentation of signal strength, left/right line deviation, and line guidance in substantially the same visual elements that guide a user during the tracking of metallic lines using electromagnetic methods.

This disclosed method maps the radar range data, combined with position information from inertial sensors, through a multi-order Kalman filter, enabling a smooth predicted path of the non-metallic line based on measured data and physical models. Though this method can stand alone and be implemented on GPR-only locating systems, the preferred embodiment takes advantage of the dual-mode aspect of the invention and enhances the depth accuracy of GPR systems using electromagnetic (EM) line locator measurements made during calibration.

The invention also makes use of the EM locator's independent (and quite accurate) depth measurement capability to accurately deduce the radar signal velocity and hence the dielectric constant of the soil in the immediate vicinity of the GPR based non-metallic line locates. Since the radar signal time delay to target is directly proportional to the velocity of propagation of the radar signal in the soil, the present invention leads to better GPR-based location accuracy (both centerline and depth) when the velocity (and hence the radar echo return time) is correctly calibrated by the EM system.

In present GPR systems the diameter of utility lines is not normally measurable, especially when the longer wavelengths necessary for ground penetration to several feet are used. As a result of this wavelength issue, all utility conveyances having diameters on the order of 6 inches or less will appear in a radar image as equivalent. In fact once the system is calibrated for depth, the characteristic hyperbola shape of detected utility lines (see FIG. 2) will be the same independent of depth or diameter. This fact becomes useful in the mathematical treatment to follow.

DESCRIPTION OF THE EMBODIMENTS

Figure 5:
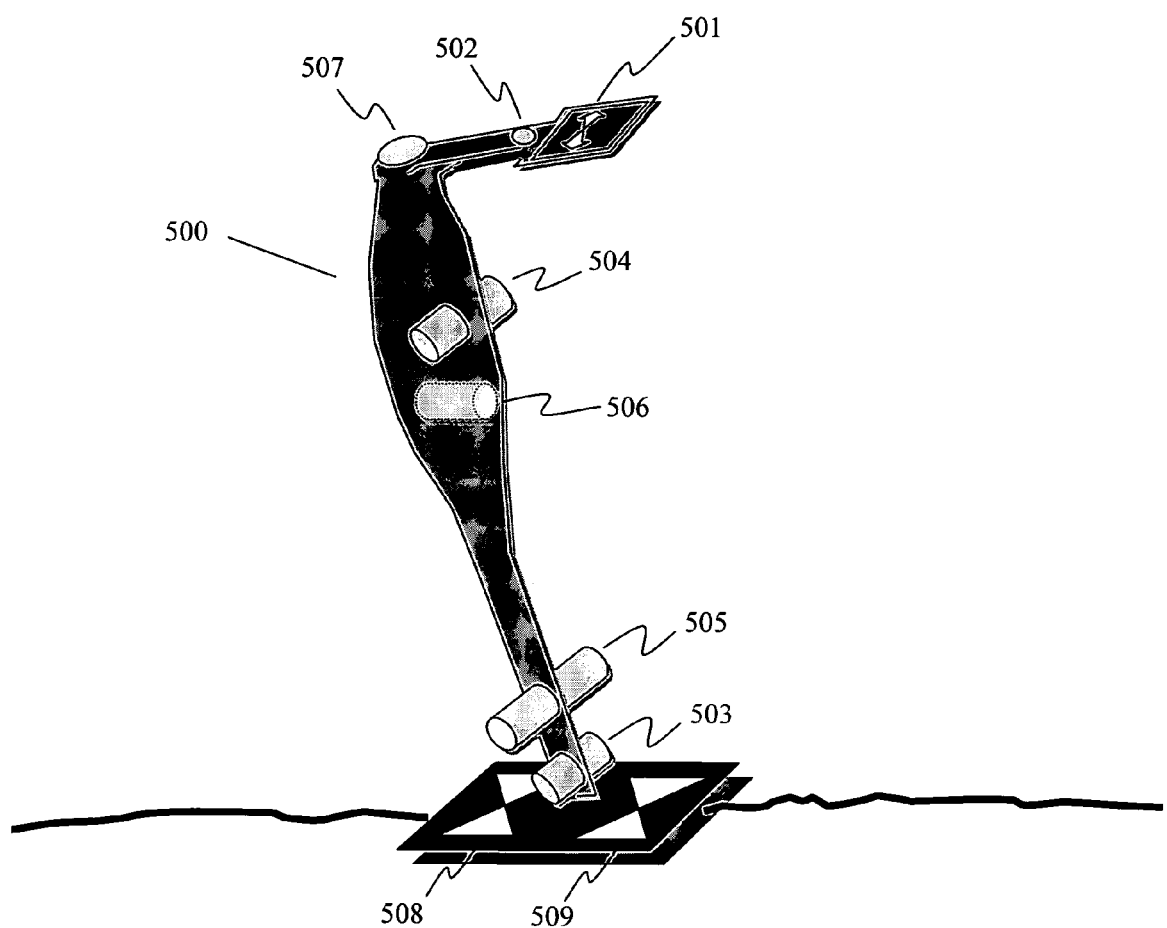
FIG. 5 shows one embodiment of a dual mode line locator, combining electromagnetic and ground penetrating radar location methods.

Line locator 500 in FIG. 5 offers both EM and GPR location methods and thus is a dual mode locator for both metallic and non-metallic utility lines. Out of view of the locate technician operating locator 500 is a buried utility line. If an active EM signal from a transmitter (not shown) has energized the line, the induced magnetic field is essentially concentric and five coils 503 (bottom reference), 505 (left/right, includes two coils), 504 (top), and 506 (guidance) generate received signals that are processed using the methods previously disclosed in U.S. patent application Ser. No. 10/622,376, which is herein incorporated by reference in its entirety. Display 501 and speaker 507 alert the user to the signal strength, left/right deviation from centerline, depth to the conducting line, and a preview of any upcoming turns in the line (using a guidance compass display 604, FIG. 6). The depth is calculated by the ratio of signal levels between the top and bottom coils, using an algorithm described in U.S. patent application Ser. No. 10/189,342, "Detecting Field Distortion In Underground Line Location", by Russell N. Bigelow, which is herein incorporated by reference in its entirety. The depth accuracy is better than 5% using this method, up to about 4 meters for reasonable signal levels.

The user interacts with the battery operated, handheld locator via hard-key and pointing device 502, which is also used to switch between EM and GPR modes. In GPR mode, the aforementioned coils 503, 505, 504, and 506 are normally inactive, since the GPR tracked line is assumed to be non-metallic. However this doesn't have to be the case, if processing power is not an issue. For example, it would be useful to have simultaneous operation of EM and GPR modes when it is impossible to gain access to the conducting line in order to directly couple a transmitter signal, or when the transmitter signal is very weak (i.e., far from the receiver, and the signal is low due to capacitive losses to ground). In either case, transmit antenna 508 and receive antenna 509 are active in GPR mode, with common DSP based processing electronics present within the locator body 500.

Though bowtie antenna 508, 509 are normally made of copper foil, little interference effect is seen by the EM coils 503, 505, 504, and 506. This is because an energized line creates a concentric magnetic field around the conductor according to the right hand rule, and thus all the EM coils are exposed to maximum signal when the locator is aligned along the line to be tracked. Note for the configuration highlighted in FIG. 5, the maximum EM strength signal results when the bowtie antennas are directly positioned over the centerline. In GPR mode, this will also turn out to be the case.

Figure 6:
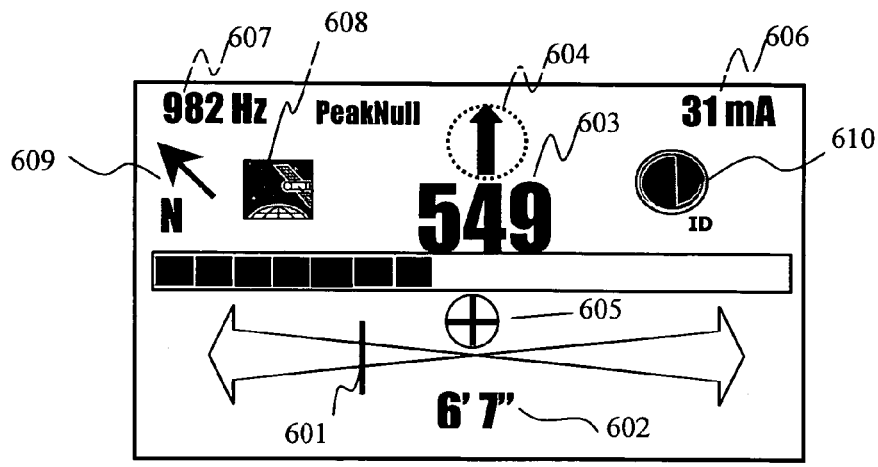
FIG. 6 is a typical user interface for a conventional electromagnetic line locator.

The user interface in EM line locate mode can be exceedingly simple, as the embodiment shown in FIG. 6 demonstrates. A primary display element is the "proportional left-right" bar 601 that provides the user real-time feedback on how far off the centerline is the locator. In normal operation the locator is swung left-right-left at a rate of about 1 Hz, and the vertical bar travels side-to-side with little perceptible latency. The degree of divergence of the bar is proportional to the distance from the centerline. Typical side-to-side travel distances are about ¼ to ½ meter peak excursion, depending on depth (more excursion for larger depths). Even an excursion of a few centimeters can result in perceptible travel of the vertical bar. Depth 602 is continuously displayed, and is the result of the calculation mentioned above. The calculation is invoked on data collected only when the locator is at the centerline. Thus new depth estimates are available at about a 1 Hz rate based on the swing frequency used by the locator technician. Signal Direction indicator 605 presents feedback of the detected direction of current flow in the tracked line, and provides the EM locator technician an alert that the signal may have been subject to capacitive bleed-over to adjacent conductors. Bar graph and numeric readout 603 presents the Signal Strength measurement, and is also used to determine the centerline position. The concentric field lines emanating from the conductor result in maximum coil 503, 504 output at centerline, and fall off toward the side. The rate at which this occurs again depends on depth (reduced fall off with increased depth).

Guidance compass display 604 presents a preview of a direction change in the tracked line, and derives its benefits from a forward facing coil on the locator 506. When this coil's signal is compared to the bottom reference coil 503, a left or right heading change can be detected in advance of when the left/right display indicates a departure from centerline.

The remainder of features present on the EM line locator interface in FIG. 6 include the display of the active transmitter frequency 607, the measured current in the line 606, and an Earth compass heading 609 that points to true north after magnetic declination corrections. It is used in the generation of absolute coordinates and to align mapped line locate displays to the actual environment. Icons 608 and 610 indicate the active connection to a GPS receiver and the presence of a buried marker, respectively. A fully digital implementation of an electronic marker locator that could coexist with the present invention is described in U.S. patent application Ser. No. 10/759747, "Method and Apparatus for Digital Detection of Electronic Markers Using Frequency Adaptation", by Johan D. Överby and James W. Waite, which is incorporated by reference into this disclosure.

In GPR tracking mode, the user interface is very similar. After depth calibration (described below), the user must establish a fix on the target prior to "walking the line". Normally this happens just as for an EM locate, by traversing the area looking for a L/R deflection of bar 601. Many times a line must be tracked from a known source. For example, plastic water pipes are commonly used for irrigation systems, but these pipes generally terminate at a known distribution location. A reasonable tracking approach is to begin at the known location, establish a fix, and then begin walking the line while monitoring the left/right deflection.

Figure 7A:
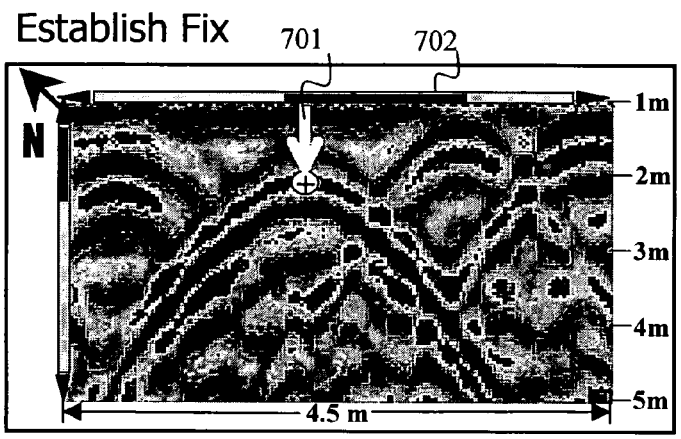
FIG. 7A is a static view of the radar range data used to establish a fix on the line to be tracked, while the dynamic tracking and line location screen is shown below in FIG. 7B.

Standing in one location and swinging the locator over the suspected position of the line can establish the fix. In more complicated cases, the user can walk the locator over a few meters and record the radar range data in a map, as is shown in FIG. 7A. Scroll bar 702 allows a review of the line just scanned which can represent several underground utilities or other objects. Though FIG. 7A is a busy presentation indicative of several buried pipes in the top 2 meters of soil, it is a repeatable measurement along a single axis—the user does not walk forward until the signature hyperbola is denoted as the line to be tracked. Furthermore, some embodiments of the locator user interface allows switching between the two views shown in FIGS. 7A and 7B easily, online as data is being measured and displayed. Using the thumb operated pointing device, the white arrow 701 in 7A can be dragged to the hyperbola that represents the line to be fixed as the "tracked line". Once a button is pressed to tell the system to track that line, then the FIG. 7B display can be selected, and the left/right swinging motion invoked in order to validate that the locator has a lock on the line using a combination of physical models, measured data, and an optimal multi-order Kalman filter.

The Kalman filter operations both predict the next expected line position and correct for the current one. These filters are described in detail below, after the calibration and inertial sensing systems are exposed. Residual errors in the detection process are monitored online to detect when the locator has lost the lock, as can occur when the line makes a sharp turn at an elbow joint, for instance. At this point the user can return to the "Establish Fix" display (FIG. 7A) and manually sweep the locator through the test field from the known position of the last lock. Tracking can proceed once a reorientation of the locator along the new direction has occurred, and the user has reselected a new hyperbola apex as the line of interest.

Figure 7B:
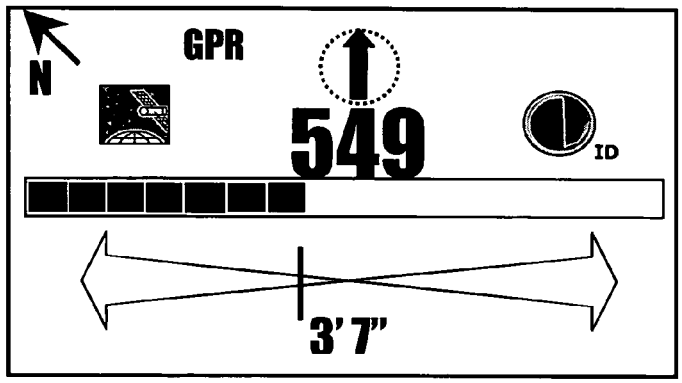
FIG. 7 is one embodiment of the user interface for a dual mode line locator, when in GPR mode.

From the establishment of the lock, the primary display screen is used to maintain the lock on the tracked line. One such embodiment of this interface is represented by FIG. 7B. Notice that the pertinent EM line locate display features are also present in the GPR display, including the left/right proportional display, the guidance compass, the signal strength, and Earth's compass heading to true north.

The signal processing steps necessary to realize the GPR locator system user interface is now detailed, starting with the depth calibration operation. Using the preferred embodiment, the EM line locator is used to determine the depth of a metallic line in the vicinity of the non-metallic lines to be traced. The vicinity can be defined as any region for which the soil dielectric constant is essentially similar. The chosen metallic line is energized with a standard narrowband EM locate signal, either by direct or inductive coupling, and the locator is used to calculate depth per the procedure referenced above. Depth calculations can be done with very high accuracy when the signal level is high, for example when the receiver is not too far away from the point of signal injection.

Next, at the same position that is directly over the conductive metal line, the GPR mode is made active. Since a metal line is a very reflective target, a single radar ping will result in a strong return from the target line. Multiple pings can be averaged together to reduce background noise. A threshold operation can be used to detect the elapsed time to the target from return signal. Since this is the same target as from the EM locator depth operation, it has known depth. Therefore to calibrate the GPR system, the two-way travel time (2T) for that target is used to calculate the radar signal velocity:

$$v = 2\left(\frac{depth}{2T}\right) \quad \text{(EQN. 1)}$$

Typical GPR signal velocities range from a few centimeters per nanosecond up to about 25 cm/ns. The velocity v is stored after calibration for subsequent use, including the measurement of unknown depths given the two-way travel time. In the physical models developed below, v is taken as a constant. Any changes in soil dielectric constant (and thus v) that occur over the test field are included in the noise model.

Figure 8:
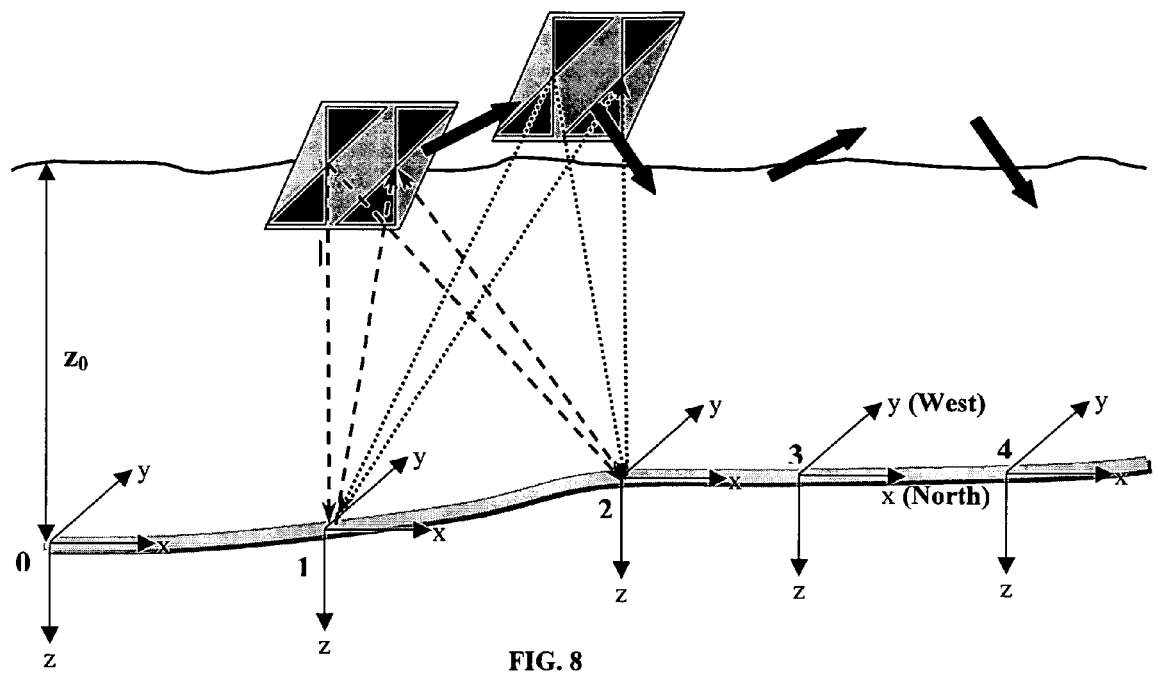
FIG. 8 demonstrates the preferred mode of use in GPR tracking mode. The user walks down the line swinging the GPR antenna assembly to the left and right of the line, monitoring the centerline and depth in real-time.

After calibration using the EM depth measurement, the GPR mode is ready to track lines that are not known in position or depth. Once a positive lock on a target line is determined per the procedure above outlined in the GPR user interface discussion, tracking can begin. In FIG. 8, this procedure is highlighted. The locator 500 with GPR antenna assembly 301 is moved down the line in a lazy zig-zag pattern, crossing the line an additional four times after the starting position (denoted position zero in FIG. 8). The incident angle (angle of attack) of each crossing is not important, but is controllable by the user based on the responsiveness of the locator left/right display. Just as in the EM locator swinging motion, the operator gains more precise feedback of the centerline position by taking the locator off-line to force deflection of the left/right indication 601.

A 2-axis inertial accelerometer sensor is mounted in the foot of the locator so that deflections of the GPR antenna assembly are measurable by double integration, both from centerline of the tracked utility and in an absolute sense. A line locator that includes such a sensor is described in U.S. patent application Ser. No. 10/407,705 "Buried Line Locator with Integral Position Sensing", by Gordon Pacey and assigned to Metrotech Corporation, which is herein incorporated by reference in its entirety.

Figure 9:
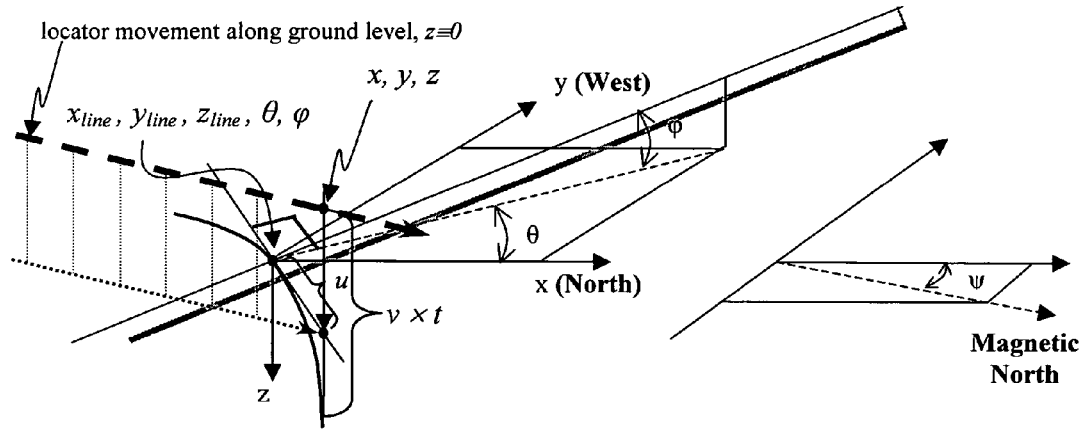
FIG. 9 represents the geometry of the GPR tracking application. The tracked line is shown in absolute coordinates relative to true north, with x, y=0 at the start of the tracking operation and z=0 at ground level.

To avoid cumulative errors in the integration of the measured inertial acceleration to x and y position, the integrations are reset at each centerline crossing. Thus absolute x, y position fixes are made at every centerline crossing, and the accelerometer system provides a relative position of the GPR antenna assembly until the next centerline crossing. Position zero (the start of the GPR tracking operation) in FIG. 8 is taken as the point x≡0, y≡0, z≡0. If a connection to a GPS receiver is active, this point can be associated with a latitude and longitude. Position determinations of the tracked line are made at each crossing (points 1, 2, 3, 4 in FIG. 8), and result in an array of absolute measurements of $x_{line}$ and $y_{line}$. These values are logged to the locator's non-volatile memory. The quantity $z_{line}$ is always referenced from ground level, though an alternative embodiment could consider depth of the line an absolute quantity as well, referenced in Earth coordinates. As shown in FIG. 9, the x direction is arbitrarily chosen to correspond to true north, and thus the y direction points to west. This convention is only important when the tracked line is presented on a map display, such that the map can be oriented with the local geography. Note that the locator also has a 3-axis magnetometer (compass sensor) aboard that measures the magnetic declination $\psi$ at each logged centerline point.

During the back and forth motion of the locator over the centerline, the GPR antenna assembly is kept close to the ground to ensure adequate coupling of the transmitted energy. Two-way travel time measurements are performed at a rate roughly equal to every centimeter (or less) of the targeted line. At a normal walking speed (while locating by left/right swinging) of 3 km/hour, this is equivalent to a scan rate of 83 Hz, well within the specification range for modern day GPR systems. This scan rate will generally support the acquisition of 1024 samples per scan, for a total sampling requirement of 85 kHz. For a depth range of 4 meters, the depth sampling interval is then 0.4 cm. Clearly, one who is trained in the art of GPR system design can modify the parameters described in this example to configure the system in other ways appropriate to the depth range and target of interest.

At the desired sampling rate, the GPR signal is acquired and the two-way travel time to the target is determined. If we denote half this quantity by t (the one-way travel time), then with the developments noted in the preceding paragraphs we have established real-time measurements of $\ddot{x}$, $\ddot{y}$, t, $\psi$ are available at every scan (for example, at a rate of 83 Hz), as the locator is moved back and forth over the line while the user is walking forward and monitoring the left/right indication.

Also from FIG. 9, in addition to the tracked line position $x_{line}$, $y_{line}$, $z_{line}$ at every centerline crossing, we need an estimate of $\dot{\theta}$, the rate of change of the line curvature. This quantity is used for a similar purpose to the guide compass coil 506. It is very valuable to the locate technician to have an indication of a curving line. Since the turning radii of buried pipes and cables is generally large compared to the rate of travel of the locate technician, $\dot{\theta}$ can be used in GPR mode to drive the guide compass display 604. The only time this is not the case is when an elbow joint in the line causes an abrupt change in direction of the line. In this case the guide compass won't help ($\dot{\theta}$=0 until the elbow is reached), but the user will experience an immediate divergence of the left/right indication as the locator's GPR antennas move off the centerline after the elbow.

The tracking model pertinent to this application is the equation of a hyperbolic trajectory from the perspective of the ground at a perpendicular distance u from the centerline:

$$u=\sqrt{v^2t^2-z^2} \quad \text{(EQN. 2)},$$

where v is the calibrated radar signal velocity, t is the one-way travel time (determined by division by two of the measured two-way travel time to the target and a threshold operation), and z is the depth of the target line from the surface. The predicted value u is as graphically depicted in FIG. 9. For every scan at known z, a travel time t multiplied by the velocity v results in a prediction of the perpendicular off-axis distance u. From the inertial sensors we have an independent measure of the actual off-axis position from a target line positioned at the last centerline crossing. Therefore a consistent (i.e., after filtering) difference between these estimates can represent a change in heading $\theta$ of the line. The depth of the target line $z_{line}$ is known only at the last centerline crossing, and thus z must be predicted before use in EQN. 2. This estimate is derived from a measure of the rate of change of $z_{line}$ from one centerline crossing to the next. The centerline represents the very apex of the hyperbola, and so these samples are used reliably in a calculation of $\dot{z}_{line}$. Then at any point between crossings of the centerline, z can be predicted from the last known value of $z_{line}$ at centerline and the present rate of change $\dot{z}_{line}$ (which of course for actual buried utilities, does not change too abruptly).

With these measures of t, v, and z, a multi-order Kalman filter is designed that predicts the model state, consisting of the parameters x, y, z, $x_{line}$, $y_{line}$, $z_{line}$, $\dot{z}_{line}$, u, v, $\theta$, $\dot{\theta}$, $\phi$, $\dot{\phi}$, $\psi$, and subsequently corrects the measured values $\ddot{x}$, $\ddot{y}$, t, $\psi$. In doing so, one can consider the tracking method to result in a "hyperbola locked condition", during which the off-axis distance u is predicted on every scan step (at an 83 Hz rate, for example). This state value, compared to the relative excursion of x and y as derived from the inertial sensors, forms the value that is presented to the user in the left/right deflection indication 601. When the system is tracking and locked on to the line, the data vector $x_{line}$, $y_{line}$, $z_{line}$, $\dot{\theta}$ is logged to the locator memory at each centerline crossing. If a GPS receiver is active, the GPS coordinates can also be logged, as well as a date and time stamp.

In practice a non-uniform beam pattern must also be calibrated for, due to mounting geometries, since the hyperbolic equations assume a uniform antenna pattern. Although the bowtie antenna has a fairly uniform beam pattern, the bistatic offset between the transmit and receive antennas creates a source of error. A weighted Kirchoff's Migration can be used to backout the beam pattern during a calibration operation on the targeted line. This operation would be invoked during the "Establish Fix" method defined above and shown in FIG. 7A, and is not presented at the level of the user interface.

Figure 10:
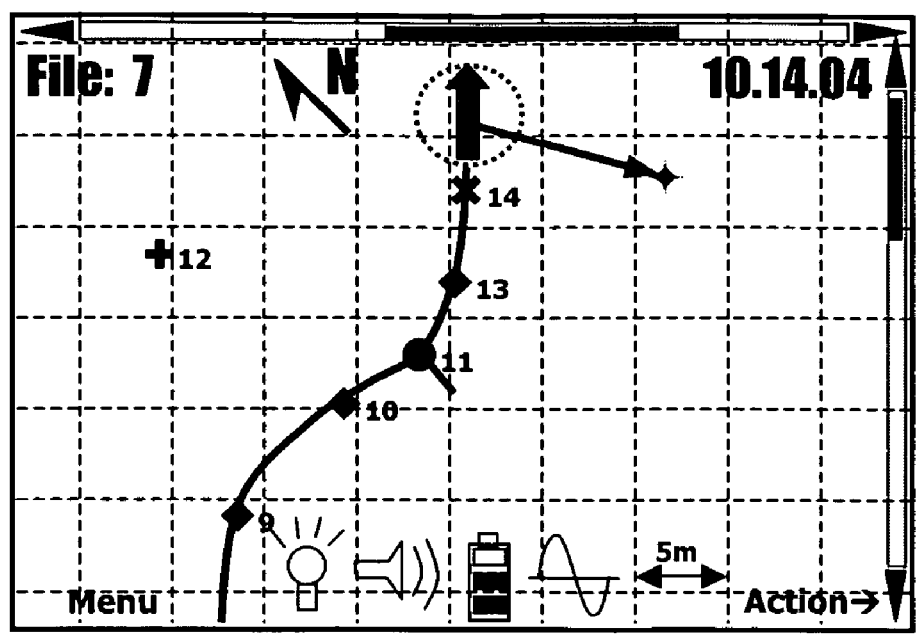
FIG. 10 shows one embodiment of a 2-D map view that presents a bird's eye view of the tracked utility line.
Figure 1:
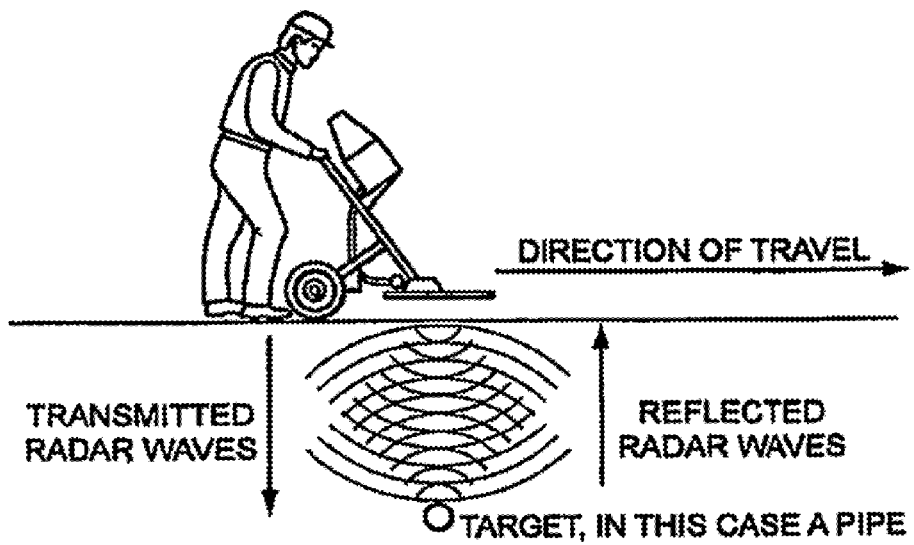
Figure 2:
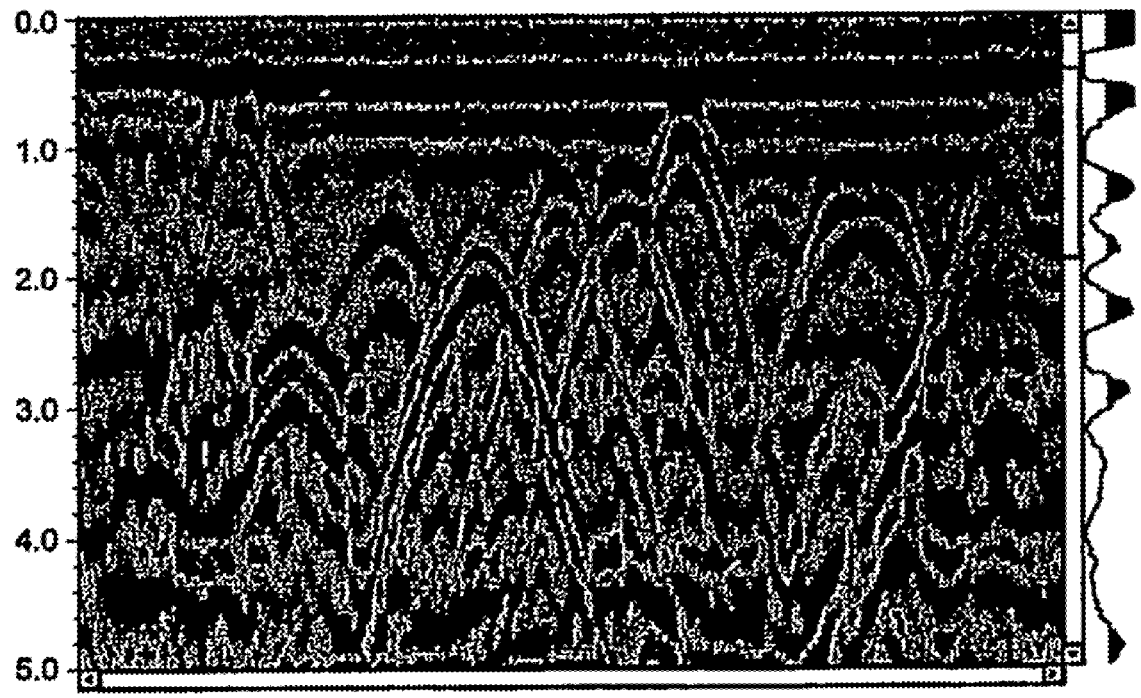

A 2-D Map View shown in FIG. 10 is an alternative presentation available to the user for selection at any time. A green cursor marks the current locator position, but all previously logged data vectors are displayed on the map. The Guide Compass and Earth Compass collaborate to show the absolute relationship between the line direction and the local geography. The combination of the located centerline, a dual axis accelerometer and link to a pocket GPS system (Bluetooth enabled) establish the user's current position on the map. When the user turns the locator off-line, directing the instrument toward the reference point (for example a fire hydrant or light post), the accelerometer based tracking algorithm measures the travel distance and direction relative to magnetic north, plotting the path traveled and actual reference point position.

To complete the off-line excursion, the user returns by walking to the last position on-centerline. The accelerometer tracking system will move the cursor to roughly the correct position on the map, but if a small deviation exists the pointing device 502 can be used to position it correctly. As soon as the cursor is over the line, the "hyperbola lock" is reestablished, and normal line tracing can resume.

Objects whose GPS coordinates are known are collectively termed Waypoints. The user can download any number of Waypoints (up to memory limits, of course) to the locator. Whenever a GPS link is active (as described by the satellite icon), Waypoints are displayed on the Map View whenever the current position and map scale are inclusive of the Waypoint(s).

The embodiments described herein are examples only of the invention. Other embodiments of the invention that are within the scope and spirit of this disclosure will be apparent to those skilled in the art from consideration of the specification and practice of the invention disclosed herein. It is intended that the specification and examples be considered as exemplary only and not limiting. The scope of the invention, therefore, is limited only by the following claims.

What is claimed is:

1. A buried utility line locator, comprising:
   an electromagnetic locator that senses the electromagnetic signal from an electromagnetically charged metallic utility line and determining the location and depth of the metallic utility line;
   a ground penetrating radar that senses the location and depth of non-metallic and metallic utility lines;
   an inertial position sensor that senses the change in location of the locator relative to the centerline position of the utility line; and
   a microprocessor that executes a signal processing algorithm that predicts track of the target utility line based on inputs from the ground penetrating radar and the inertial sensor data, using depth calibration data derived from independent operation of the electromagnetic locator.

2. The buried utility line locator of claim 1, further comprising a display shared between the line locator and the ground penetrating radar, the display including:
   a proportional, distance sensitive left/right indication of divergence of the line locator from the target centerline;
   a guidance compass display that alerts the user to large scale curvature and direction changes in the tracked line; and
   a depth readout that displays the real-time depth of the tracked utility line.

* * * * *

UNITED STATES PATENT AND TRADEMARK OFFICE
CERTIFICATE OF CORRECTION

Figure 1:
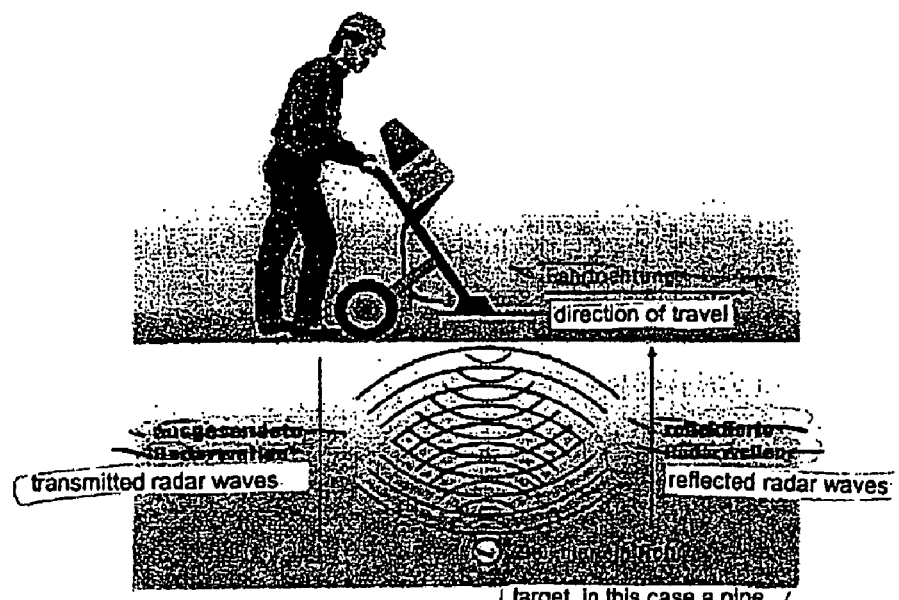
FIG. 1 shows an operator using a prior art GPR system to collect radar signals for later analysis and post-processing.
Figure 2:
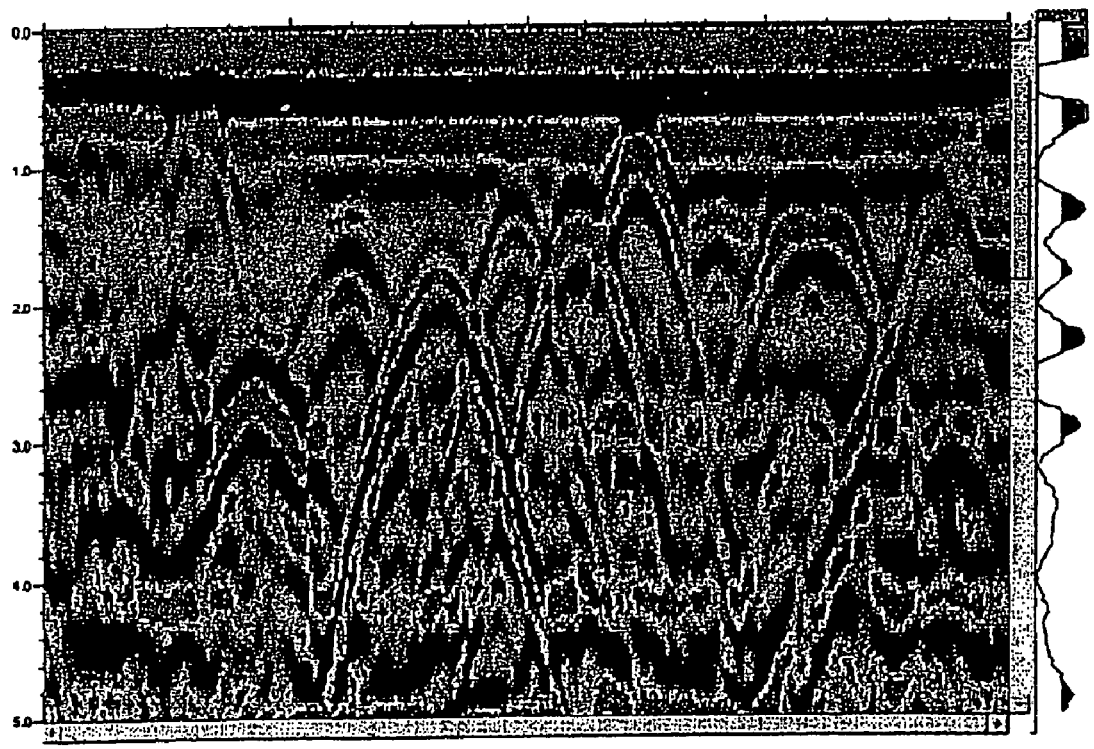
FIG. 2 is an example of the radar echo signal map that appears on displays of prior art GPR utility survey systems. The horizontal axis is linear position on the ground, and the vertical axis is depth.
Figure 3:
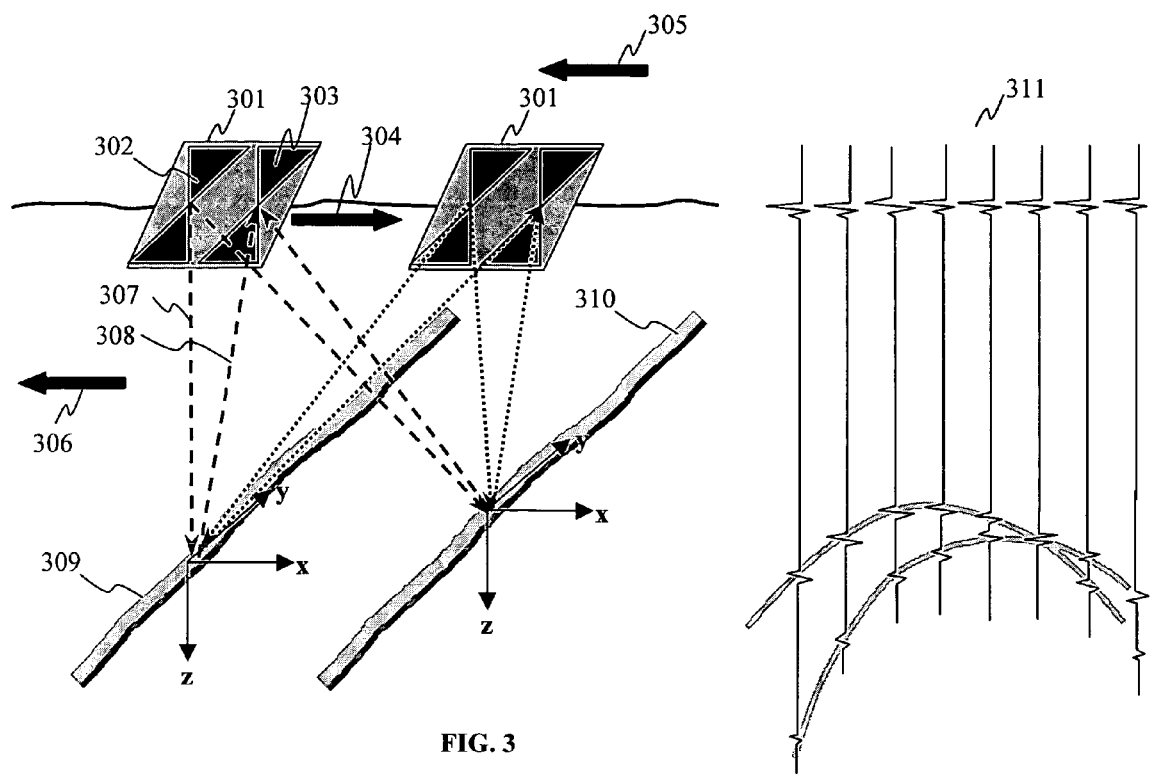
FIG. 3 is a pictorial view of a single GPR antenna assembly moving over the ground, which contains separate bowtie transmit and receive antennas. A set of scans of the radar signal echo is shown for the traverse of one path using the GPR system.
Figure 4:
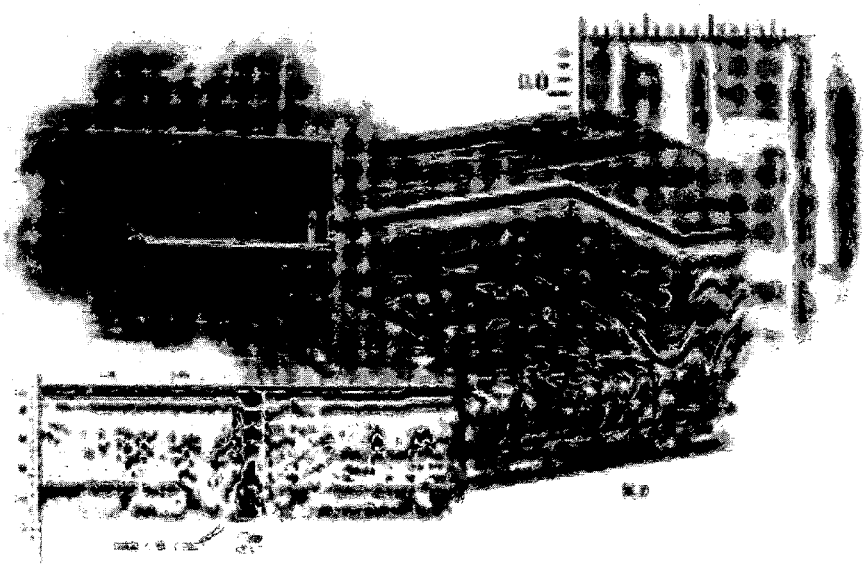
FIG. 4 shows the result of a post-processing operation in which radar scans from multiple paths are organized and presented in a 3-D pictorial of the detected subsurface utility lines.

PATENT NO. : 7,113,124 B2
APPLICATION NO. : 10/997729
DATED : September 26, 2006
INVENTOR(S) : James W. Waite It is certified that error appears in the above-identified patent and that said Letters Patent is hereby corrected as shown below:

In the Drawings
Please delete figs. 1 and 2 and replace with figs. 1 and 2 which are attached.

Signed and Sealed this

Twenty-second Day of May, 2007

JON W. DUDAS
*Director of the United States Patent and Trademark Office*